Aug. 31, 1948.  E. LABIN ET AL  2,448,034
ELECTRICAL PULSE MEASURING SYSTEM
Filed May 15, 1943  2 Sheets-Sheet 1
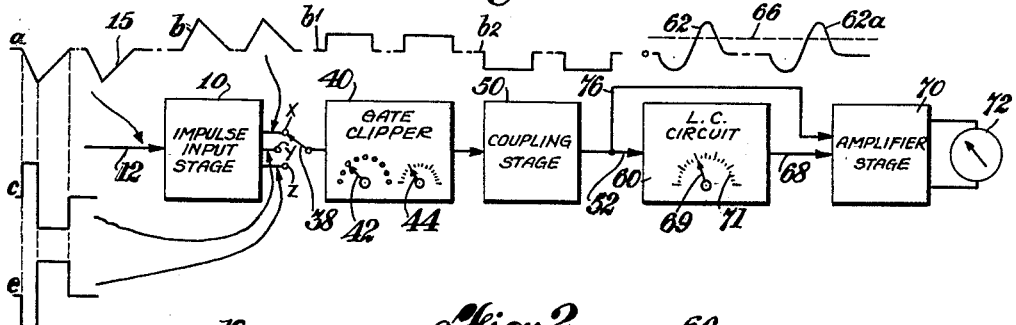
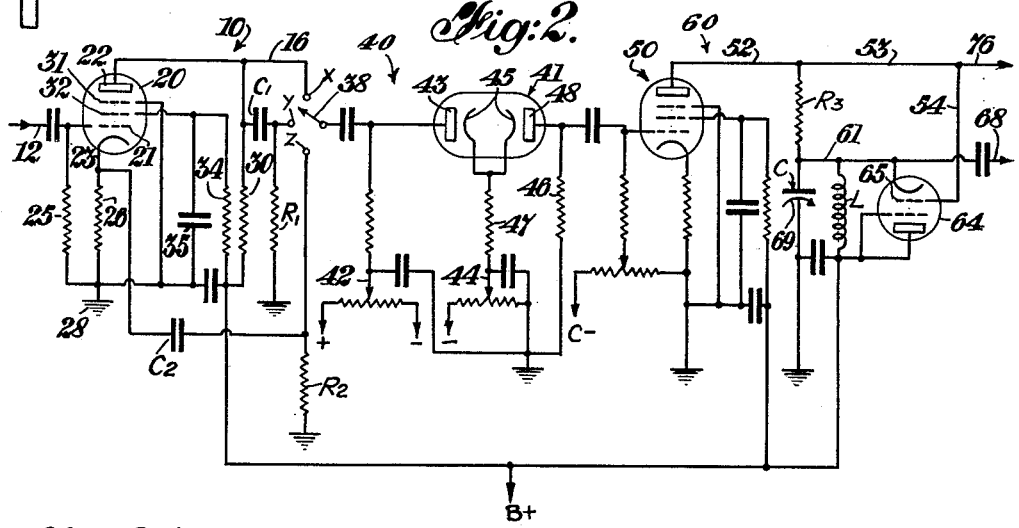
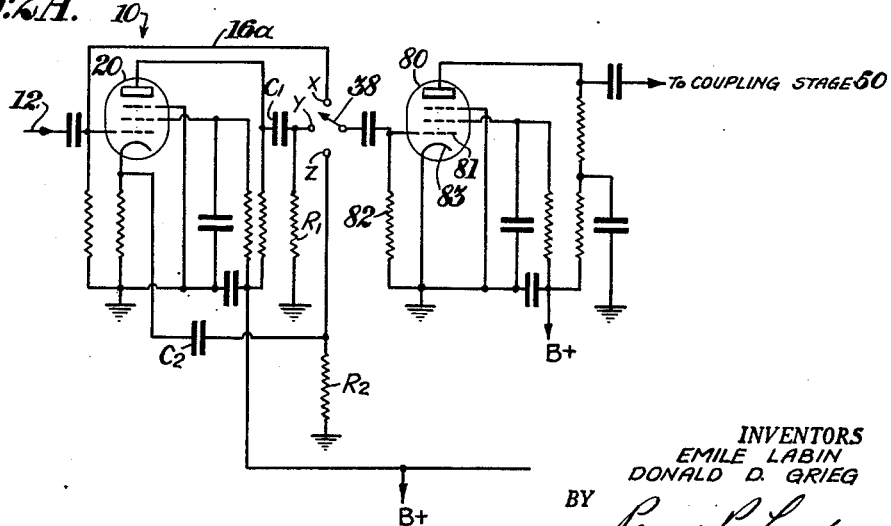
INVENTORS
EMILE LABIN
DONALD D. GRIEG
BY
ATTORNEY Aug. 31, 1948.  E. LABIN ET AL  2,448,034
ELECTRICAL PULSE MEASURING SYSTEM
Filed May 15, 1943  2 Sheets-Sheet 2

INVENTORS
EMILE LABIN
DONALD D. GRIEG
BY Percy P. Lantz
ATTORNEY

Patented Aug. 31, 1948

2,448,034

UNITED STATES PATENT OFFICE 2,448,034

ELECTRICAL PULSE MEASURING SYSTEM

Emile Labin, New York, and Donald D. Grieg, Forest Hills, N. Y., assignors to Federal Telephone and Radio Corporation, Newark, N. J., a corporation of Delaware Application May 15, 1943, Serial No. 487,073

7 Claims. (Cl. 175—183)

This invention relates to radio impulse systems.

An object of our invention is to provide a method and means for measuring impulse characteristics such as pulse duration, period of amplitude change, such as build-up time and decay time, amplitude and/or the general shape of the impulse.

According to our invention certain of the characteristics of an impulse are measured by first translating those characteristics into substantially rectangular pulse shapes the widths of which are representative of the corresponding characteristics of the impulse. One of the rectangular pulse shapes, for example, will represent the duration of the impulse, a second will represent the build-up time of the impulse and a third will represent the decay time of the impulse. The width of these rectangular pulse shapes are then measured thereby determining the duration, etc., of the corresponding characteristics of the impulse.

In radio operation the pulse duration and the build-up time of an impulse are the measurements most desired although the time of pulse decay and the amplitude of the impulse as well as the general shape of the impulse may also be of interest. By slicing the impulse at successive levels from the base to the top of the impulse thereby dividing the impulse into a plurality of approximately rectangular pulse shapes and by making measurements of the widths of these rectangular pulses, the amplitude and some information of the general shape of the impulse are obtained. The successive measurements together with measurements of the build-up time and decay time may then be used graphically to reconstruct the general shape of the impulse. The number of slices obtained multiplied by the average breadth of the slices will give the overall amplitude of the impulse.

For a more complete understanding of the invention, reference may be had to the following detailed description to be read in connection with the accompanying drawings, in which:

Fig. 1 is a block diagram of a pulse measuring system according to our invention;

Fig. 2 is a schematic wiring diagram of the main portion of the system of Fig. 1;

Fig. 2A is a schematic wiring diagram of a simplified limit clipper that may be used for most purposes in the circuit of Fig. 2 in place of a double diode limiter therein shown.

Figure 3:
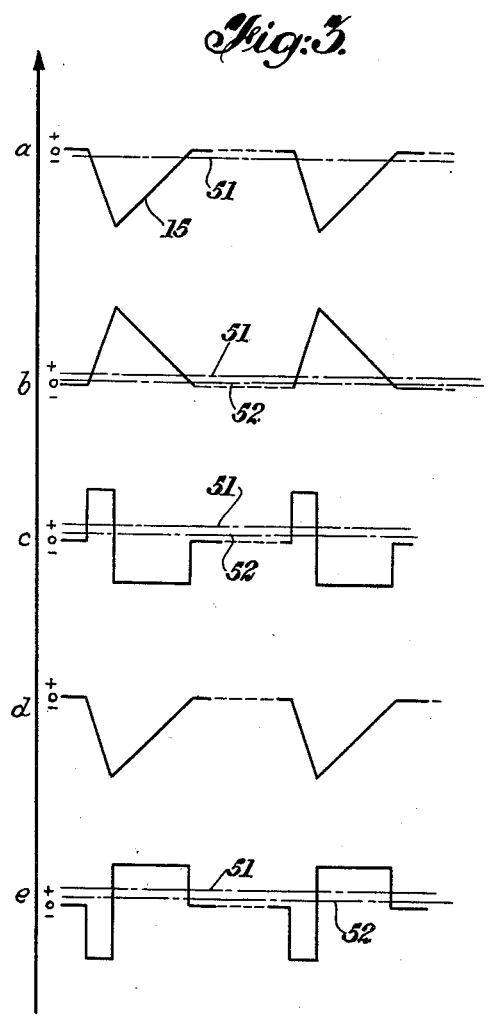
Figs. 3, 4 and 5 are graphical illustrations of the operating steps of the system.

Referring to Figs. 1 and 2, the pulse measuring system according to our invention includes a pulse translating feature including an impulse input stage 10 to which the impulse to be measured is applied at an input connection 12. The impulse is applied with negative polarity as indicated by the train of impulses 15. The pulse input stage 10 is provided with three output terminals $x$, $y$ and $z$. The input stage 10, see Fig. 2, includes a vacuum tube 20 having a grid 21 to which the input 12 is connected. The anode 22 of tube 20 is connected directly to the terminal $x$, and to the terminal $y$ through a differentiating circuit comprising a condenser $C_1$ and a resistor $R_1$. The cathode 23 of the tube 20 is connected through a differentiating circuit comprising a condenser $C_2$ and a resistor $R_2$ to the terminal $z$. The grid 21 and the cathode 23 are connected through suitable resistors 25 and 26 to ground at 28. The anode 22 is connected through a load resistance 30 prior to the condenser $C_1$ to a source of positive potential B+. A suppressor grid 31 of the tube 20 is connected to the ground connection 28 and a screen grid 32 is connected by a resistor 34 to the positive potential B+ and by a condenser 35 to the ground connection 28.

Referring to Figs. 1 and 3, graphical illustrations are shown indicating the operating steps of the system. In Fig. 3 all the curves are plotted to the same time base. Curve $a$ represents the input impulse energy 15. The potential on the anode circuit applied to the terminal $x$ is represented by curve $b$. This potential is positive, it being opposite in polarity to the negative pulse input potential of curve $a$. The potential appearing at the terminal $y$, after the anode potential is differentiated by the differentiating circuit $C_1$, $R_1$, is indicated by curve $c$. Curve $d$ represents the pulse energy at the cathode 23 which in the circuit of the tube 20 will be of the same polarity as the input pulse energy of curve $a$. By differentiating this energy through condenser $C_2$ and resistor $R_2$, an output potential is provided at the terminal $z$ corresponding to the curve $e$.

The terminals $x$, $y$ and $z$ are associated with a movable contact 38 whereby the output energy of these terminals may be selectively tapped-off. The contact 38 is connected to the input of a gate clipper 40 which performs a further part of the impulse translation feature of our invention. The gate clipper 40 comprises a series diode double limiter tube 41 of the character disclosed in our copending application entitled "Indicating and calibrating means," Serial No. 437,530, filed April 3, 1942. The tube 41 is provided with a potentiometer 42 by which a bias of desired positive or negative magnitude as the case may be, can be applied to the anode 43 thereof. A second potentiometer 44 is provided to supply an adjustably controllable negative bias to the cathodes 45. The tube 41 is provided with a load resistor 46 connected between the anode 48 and ground. In operation the anode 43 is biased with respect to the cathodes 45 and ground so as to permit the space discharge path between these elements to conduct for only a portion of the voltage swing of the applied impulse. This results in a limiting or clipping operation at a level such as 51 (curve $b$, $c$ and $e$, Fig. 3), whereby the clipped potential of the input impulse appears across the biasing resistor 47 associated with the potentiometer 44. The cathodes 45 however, are normally biased negatively so that there is a normal conductive path provided between the electrodes 45 and anode 48. It follows that the impulse appearing across the resistor 47 will be conducted through the second discharge path, that is, from the cathodes 45 to the anode 48 as long as the magnitude of this voltage is less than the anode potential. This produces a second limiting level 52 below the limiting level 51 produced by the first conductive path.

It will be clear from the foregoing that the double limiting action of the tube 41 provides a gate the levels of which are adjustable. By varying the amount of the negative bias applied to the cathodes 45, by adjustment of potentiometer 44, the spread of the gate may be adjustably selected. If it is desired to change the effective position of the gate, adjustment of the potentiometer 42 will serve this purpose without changing the spread of the gate.

Figure 4:
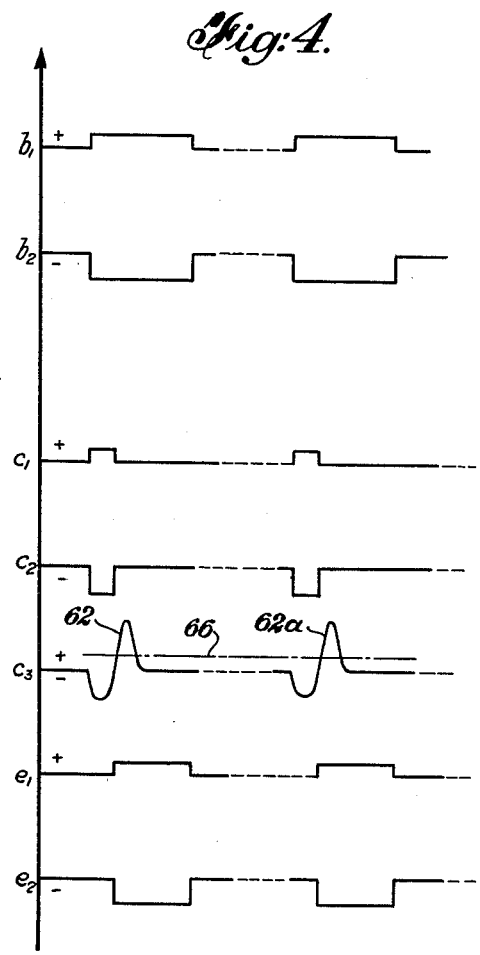

For clipping operation of the output at the terminals $x$, $y$ and $z$, the adjustment of the gate clipper may be set to provide one of the clipping operations at or close to the zero potential such as indicated by the clipping levels 52 on curves $b$, $c$ and $e$ (Fig. 3). This clipping operation as shown in Fig. 4, produces rectangularly-shaped pulses which correspond in width with certain portions of the curves $b$, $c$, and $e$. The curves $b_1$, of Fig. 4, shows the clipped portion of the curve $b$ of Fig. 3. The width of this rectangular pulse shaped represents substantially the width of the input pulse 15. Likewise, curves $c_1$ and $e_1$ of Fig. 4, represent the clipped portions of the curves $c$ and $e$ of Fig. 3, the widths of which correspond to the build-up time and decay time respectively of the impulse.

The output of the gate clipper 40 is applied to a coupling stage 50 of known character whereby the rectangularly-shaped curves of $b_1$, $c_1$ and $e_1$ are inverted so as to provide rectangular pulses of negative polarity as shown in curves $b_2$, $c_2$ and $e_2$. The coupling stage may also serve to amplify and further limit clip the pulses for increased accuracy.

The output 52 of the coupling stage 50 is applied to a pulse width measuring system 60 of the character disclosed in our copending application Serial No. 480,624, filed March 26, 1943 and issued as Patent No. 2,411,547. As shown in Fig. 2, the pulse width measuring system comprises an input resistor $R_3$ to a resonant L-C circuit 61. The circuit 61 is adapted to be shock excited by the leading and trailing edges of the rectangular pulses such as indicated by curve $b_2$ Fig. 1 to initiate oscillations. These oscillations combine to form an undulation 62, (Figs. 1 and 4) following the trailing edge of each pulse. The circuit is provided with damping means comprising a vacuum tube 64 having the cathode and anode electrodes thereof connected across the circuit 61. As disclosed with more particularity in our aforesaid copending application, the negative polarity of the input pulses at the anode connection is applied through leads 53 and 54 to a grid 65 of the tube 64 to maintain the tube blocked for the duration of the pulse. This blocking operation maintains the high "Q" of the circuit 61 so that the pulse can initiate the oscillations. The first undulation 62 formed after the trailing edge of the pulse being of a positive polarity also maintains the tube 64 blocked for the duration of the undulation. When the undulation reaches zero, however, the potential of the circuit 61 reverses in polarity, and this reversal unblocks the tube 64 so that conduction by the tube applies a low resistance path across the circuit 61. This so lowers the "Q" of the circuit 61 as to damp out all further oscillations which would normally follow the undulation 62. This produces a zero potential 66 following the undulation 62 until the next succeeding pulse is applied to the circuit 61. This next pulse in turn produces an undulation 62$a$ as indicated in Figs. 1 and 4 (curve $c_3$). The maximum undulations produced in response to pulse curves $b_2$ and $e_2$ are similar to curve $c_3$ and therefore have not been illustrated.

The output of the circuit 61 is connected by a lead 68 to an amplifier stage 70 which preferably is operated as a class "C" amplifier. The amplifier 70 is adjusted to threshold clip the undulations 62, 62$a$, etc., at a level such as 66 and to apply the energy thereof to a maximizing indicator 72. As disclosed in detail in our aforesaid Patent No. 2,411,547, tuning adjustment of the circuit 61 by adjustment of the condenser C by manual means 69, Fig. 1, the measurement of the width of the rectangular pulse is obtainable from a suitable calibration 71 for the greatest maximum obtainable for the undulations. By taking the output of the L-C circuit at connection 76 instead of at 68, a combination of the negative pulse energy existing across $R_3$ plus the oscillation energy of the tuned circuit is obtained. This depresses the initial oscillations and thus insures the following class "C" amplifier from passing oscillating energy occurring in the L-C circuit during occurrence of the rectangular pulses.

The indicator 72 may be any suitable meter or cathode ray oscilloscope whereby maximum and minimum indications of the peak voltage of the undulations are obtainable. The greatest maximum, for example, is obtainable when the period to which the circuit 61 is tuned is exactly twice the duration of the pulse.

From the foregoing, it will be clear that the pulse duration or base measurement represented by the rectangular pulse $b_2$, Fig. 4, is obtained by making measurement of the pulse $b_2$. Likewise, the build-up time is obtainable by the width measurement of pulse $c_2$ and the decay time is obtainable by measurement of the width of pulse $e_2$.

For these three measurements, a clipper other than a gate clipper of the character disclosed in Fig. 2 may be used. A suitable clipper for these three measurements is shown in Fig. 2A. This clipper comprises a vacuum tube 80 the grid 81 of which is biased to ground through a resistor 82 to provide one clipper limit while the negative cut-off characteristic of the tube determines the other limit of the clipping operation. It will be understood, of course, that the cathode may be biased at a different potential if desired. It will be noted that the terminal $x$ in this case is connected through lead 16$a$ to the input connections to tube 20. This is necessary in order to provide the proper polarity (negative) for the clipped portions of the pulses when they are applied to the circuit 61.

Figure 5:
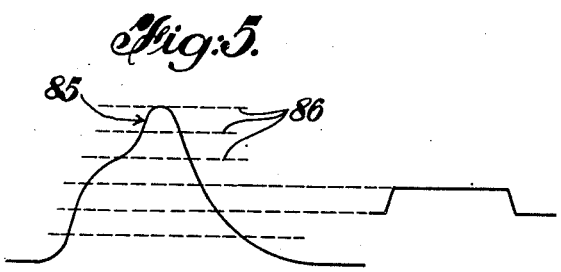

The added utility of the gate clipper 40 is the adjustable gate feature whereby the potentiometer control 42 may be adjusted as indicated in Fig. 1 to shift the clipping operation to different levels. This use of the clipper is indicated in Fig. 5 whereby the impulse 85 is sliced into a plurality of rectangular pulse shapes as indicated by the clipping levels 86. The potentiometer control 44 determines the spread of the gate. By taking a plurality of measurements at successive levels throughout the amplitude of the impulse such measurements will give, by graphical reconstruction, the general shape of the impulse. The number of slices obtained will give an indication of the overall amplitude of the impulse.

While we have shown and described the principles of our invention in connection with specific apparatus, we recognize that various changes and modifications may be made therein without departing from the invention. For example, the stages 60 and 70 may be arranged for measurement of positive instead of negative pulses. It is our aim, therefore, to cover in the appended claims all such changes and modifications as fall within the scope of the invention.

We claim:

1. A method of measuring impulse characteristics comprising translating the impulse into rectangularly-shaped pulses whose widths correspond respectively to certain values of said characteristics, and measuring the widths of said rectangular pulses to obtain measurements of said characteristic values, said translation of the impulse including gate clipping an impulse at successive levels to obtain rectangular pulse slices therefrom whereby the width of the pulse slices represent the width characteristic of the impulse at the levels at which the slices are taken and the number of slices obtainable from a given impulse times the distance between the successive levels represent substantially the amplitude of the impulse.

2. A system for measuring impulses characteristics comprising means to translate the impulses into rectangularly-shaped pulses having widths corresponding respectively to certain values of said characteristics, said translating means including means to gate-clip the impulse at selected levels to provide rectangular pulses of width corresponding to the width of the impulse at such levels, and means coupled to such gate-clipping means for measuring the width of the rectangular pulses, whereby by combination of such clipping measurements of the general shape of the impulse are obtainable.

3. A method of measuring impulse characteristics including period of amplitude change comprising translating including differentiating the impulse into rectangularly-shaped pulses whose widths correspond respectively to values of said characteristics, said translating step including also clipping the differentiated pulse at one or more selected levels, and measuring the widths of said rectangular pulses to obtain measurements of said characteristic values.

4. The method defined in claim 3 wherein the translation of the impulse includes inverting its energy whereby the width of the obtained rectangular pulse corresponds to the build-up period of the impulse.

5. A system for measuring impulse characteristics including those of period of amplitude change comprising means to translate the impulses into rectangularly-shaped pulses having widths corresponding respectively to values of said characteristics, said translating means including an input stage and pulse clipping means, said input stage having an electron discharge device, a plurality of selectable output terminals and providing separate paths for impulse energy therethrough to respective output terminals depending on the particular characteristcs being measured, said translating means also including in the input stage means for differentiating the impulse energy that is passed by way of at least one of said paths and its output terminal, means for connecting said clipping means to any one of said terminals, whereby the energy received therefrom is clipped to form said rectangularly-shaped pulses, and means coupled to said translating means for measuring said widths of the rectangularly-shaped pulses.

6. The system defined in claim 5, wherein the input stage inverts the impulse energy passing by way of one of said paths having therein differentiating means and its output terminal to provide a rectangular pulse the width of which corresponds to the building-up period of amplitude change.

7. A system for measuring impulse characteristics including those of period of amplitude change comprising means to translate the impulses into rectangularly-shaped pulses having widths corresponding respectively to values of said characteristics, said translating means including an inuut stage and pulse clipping means, said input stage having an electron discharge device, a plurality of selectable output terminals and providing separate paths for impulse energy therethrough to respective output terminals depending on the particular characteristics being measured, and wherein one of said output terminals is connected to the anode output of the said device and another output terminal is connected to the cathode output of the device, the output connections of said anode and cathode connections including differentiating means, and means for selectively connecting said clipping means to any one of said terminals, whereby one of the outputs provides a pulse shape having a width corresponding to the build-up period of said impulse and the other of said outputs provides a pulse shape having a width corresponding to the decay period of said impulse.

EMILE LABIN.
DONALD D. GRIEG.

REFERENCES CITED

The following references are of record in the file of this patent:

UNITED STATES PATENTS

| Number | Name | Date |
|---|---|---|
| 1,908,249 | Hund | May 9, 1933 |
| 2,061,734 | Kell | Nov. 24, 1936 |
| 2,132,655 | Smith | Oct. 11, 1938 |
| 2,166,688 | Kell | July 18, 1939 |
| 2,183,399 | Heising | Dec. 12, 1939 |
| 2,226,459 | Bingley | Dec. 24, 1940 |
| 2,277,000 | Bingley | Mar. 17, 1942 |
| 2,286,894 | Browne et al. | June 16, 1942 |
| 2,311,807 | Anderson | Feb. 23, 1943 |
| 2,324,275 | Becker | July 13, 1943 |